(12) United States Patent
Es-skouri et al.

(10) Patent No.: US 12,099,564 B2
(45) Date of Patent: Sep. 24, 2024

(54) USER-INITIATED WORKFLOW TO COLLECT MEDIA

(71) Applicant: Dropbox, Inc., San Francisco, CA (US)

(72) Inventors: Youssef Es-skouri, San Francisco, CA (US); Noga Raviv, Brooklyn, NY (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/238,186

(22) Filed: Aug. 25, 2023

(65) Prior Publication Data
US 2023/0401272 A1    Dec. 14, 2023

Related U.S. Application Data

(62) Division of application No. 17/563,648, filed on Dec. 28, 2021, now Pat. No. 11,836,207.

(51) Int. Cl.
| | | |
|---|---|---|
| *G06F 3/048* | (2013.01) | |
| *G06F 3/0482* | (2013.01) | |
| *G06F 16/955* | (2019.01) | |
| *H04L 51/046* | (2022.01) | |

(52) U.S. Cl.
CPC ........ *G06F 16/9558* (2019.01); *G06F 3/0482* (2013.01); *H04L 51/046* (2013.01)

(58) Field of Classification Search
None
See application file for complete search history.

(56) References Cited

U.S. PATENT DOCUMENTS

| | | | |
|---|---|---|---|
| 9,113,068 B1 | 8/2015 | Whitson et al. | |
| 9,590,932 B2 * | 3/2017 | Hwang | H04L 51/046 |
| 10,530,836 B2 | 1/2020 | Zhou et al. | |
| 11,323,653 B1 * | 5/2022 | Voss | H04N 5/77 |
| 2013/0283189 A1 * | 10/2013 | Basso | H04L 65/612 |
| | | | 715/753 |
| 2013/0302005 A1 * | 11/2013 | Harwell | H04N 21/2743 |
| | | | 386/E5.002 |
| 2014/0253574 A1 | 9/2014 | Brown et al. | |
| 2018/0052840 A1 * | 2/2018 | Scott | H04L 12/1831 |
| 2021/0397783 A1 * | 12/2021 | Jackson | G06F 40/169 |
| 2022/0206645 A1 * | 6/2022 | Zadina | H04N 21/4316 |

FOREIGN PATENT DOCUMENTS

WO    2015128758 A1    9/2015

OTHER PUBLICATIONS

Advisory Action from U.S. Appl. No. 17/563,648, mailed Jun. 9, 2023, 3 pages.

(Continued)

*Primary Examiner* — Thanh T Vu
(74) *Attorney, Agent, or Firm* — Polsinelli PC

(57) ABSTRACT

The present technology pertains to remotely initiating a capture request. According to at least one example, the present technology includes sending the request for a media capture to a recipient device of a recipient user. The request for the media capture can be configured by the requesting user so that options are chosen for the recipient. The recipient user merely needs to click on a link to cause a web browser to initiate the screen capture. In some cases, the recipient user may need to accept some prompts from their computing device to give the browser permission to perform the capture.

20 Claims, 12 Drawing Sheets

(56) References Cited

OTHER PUBLICATIONS

Final Office Action from U.S. Appl. No. 17/563,648, mailed Feb. 6, 2023, 11 pages.
Non-Final Office Action from U.S. Appl. No. 17/563,648, mailed Sep. 30, 2022, 7 pages.
Notice of Allowance from U.S. Appl. No. 17/563,648, mailed Jul. 21, 2023, 11 pages.
Requirement for Restriction/Election from U.S. Appl. No. 17/563,648, mailed Aug. 3, 2022, 4 pages.

* cited by examiner

USER-INITIATED WORKFLOW TO COLLECT MEDIA

CROSS-REFERENCE TO RELATED APPLICATIONS

This application is a divisional of U.S. application Ser. No. 17/563,648 filed on Dec. 28, 2021, entitled, USER-INITIATED WORKFLOW TO COLLECT MEDIA, which is hereby expressly incorporated herein by reference in its entirety and for all purposes.

TECHNICAL FIELD

The present technology pertains to remotely configuring and initiating a capture request at a recipient user device.

BACKGROUND

In some environments, a remote user can communicate a request for a screen capture or video recording from another user. For example, a remote user can be a customer service representative or technical support professional communicating with another user needing technical support with an application or service on their computing device. It is common for the customer service representative to request that the user provide a video or screen capture that shows the issue or shows actions taken by the user that led to the need for technical support. It can also be common for a team leader or a teacher to request a screen capture or video from a team member or a student. Such requests can be complicated when the user receiving the request is not proficient with tools for screen captures or video recordings.

SUMMARY

The present technology pertains to a remote capture service that can accessed by a requesting service which can configure a capture request to be provided to a client device of a recipient user. The request for the media capture can be configured by the requesting user or the requesting service so that options are chosen for the recipient. The client device of the recipient user can receive a link, that when selected, results in a webpage being loaded in a web browser on the client device. The web page causes the computing device to initiate the capture request using any options that were configured by the requesting user. The recipient user merely needs to click on a link to cause a web browser to initiate the screen capture. In some cases, the recipient user may need to accept some prompts from their computing device to give the browser permission to perform the capture.

After the capture is completed, the recipient user device can automatically send a capture object, including the media capture, to the requesting user or a designated service. The requesting user or the designated service can receive the media capture object. In some embodiments, the designated service can be a service for remotely initiating screen captures. In some embodiments, the designated service can be a content management system that can store and share the capture object.

DETAILED DESCRIPTION

Figure 1:
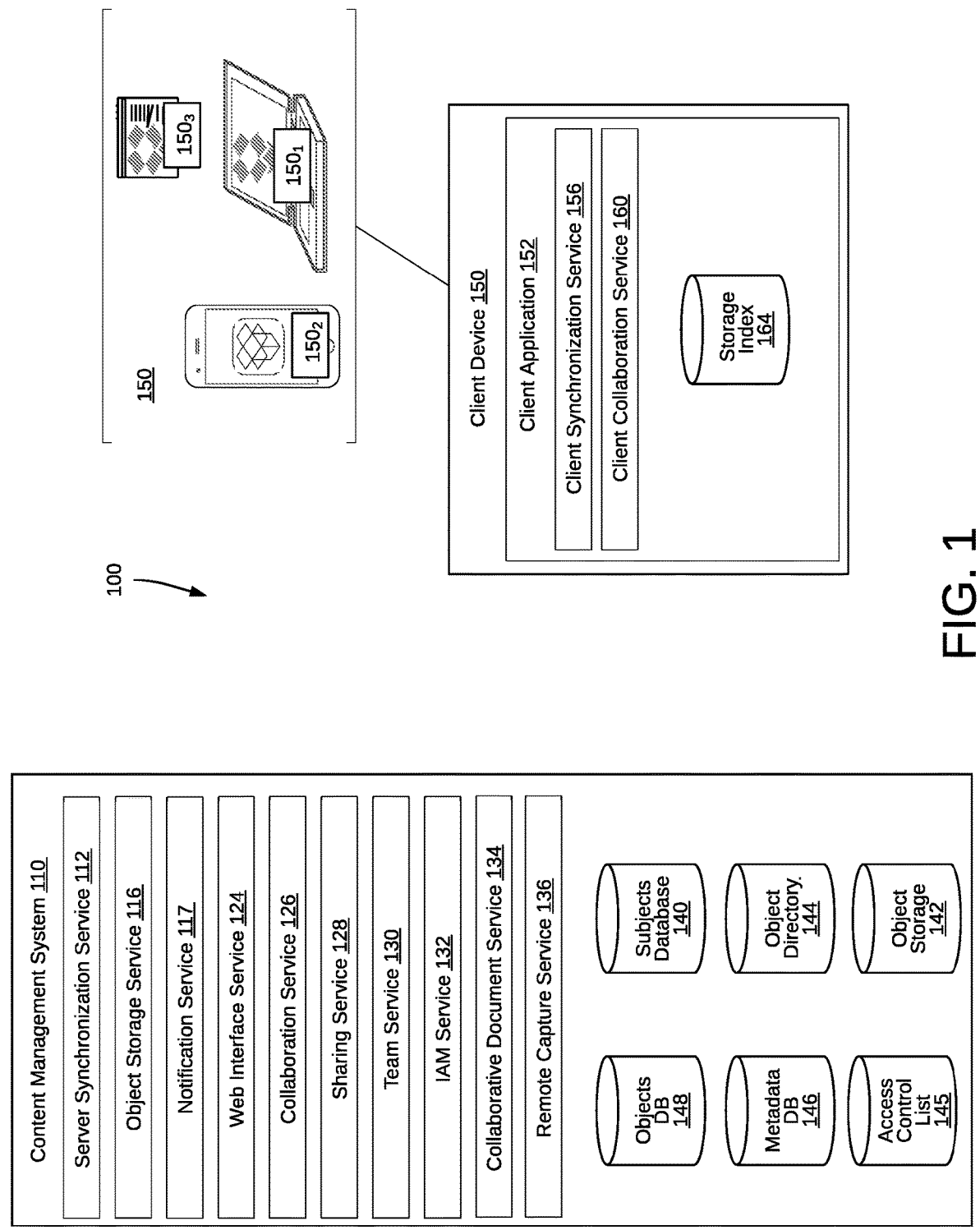
FIG. 1 illustrates an example of a content management system and client devices in accordance with some aspects of the present technology.

The present technology addresses a need in the art to provide a capture request to a recipient user that does not require an unskilled operator of a computing device to need to identify an application to perform the capture request, configure the correct options, save a file resulting from the capture request, and share the file with the sending user. Accordingly, there is a need for a solution that can allow a user to provide a capture in response to a request with fewer steps.

The present technology pertains to a remote capture service that can accessed by a requesting service which can configure a capture request to be provided to a client device of a recipient user. The request for the media capture can be configured by the requesting user or the requesting service so that options are chosen for the recipient. The client device of the recipient user can receive a link, that when selected, results in a webpage being loaded in a web browser on the client device. The web page causes the computing device to initiate the capture request using any options that were configured by the requesting user. The recipient user merely needs to click on a link to cause a web browser to initiate the screen capture. In some cases, the recipient user may need to accept some prompts from their computing device to give the browser permission to perform the capture.

In some environments, a remote user can interact with the remote capture service to request a capture or from another user. For example, a remote user can be a customer service representative or technical support professional communicating with another user needing technical support with an application or service on their computing device. It is common for the customer service representative to request a capture that shows the issue or shows actions taken by the user that led to the need for technical support. It can also be common for a team leader or a teacher to request a capture from a team member or a student. Such requests can be complicated when the user receiving the request is not proficient with tools for screen captures or video recordings.

Accordingly, the present technology provides benefits such as making it more efficient to initiate a capture by a user. It can be more efficient because an expert can remotely configure and initiate the screen capture. Furthermore, a remotely initiated capture can have additional benefits in certain environments. For example, in the Technical Support environment, a screen capture received as a result of the remotely configured screen capture can be automatically associated with a technical support ticket. In other words, many of these steps can be performed automatically rather than a user needing to manually initiate a screen capture, save the screen capture, and then upload or send the screen capture. Likewise, on the receiving user side, the technical support service does not have to identify the screen capture as part of a previous technical support ticket and can automatically resume a technical support workflow once the capture object is received.

Similar benefits can be achieved in a team environment where a team leader can request a screen capture via a communications platform, and the remotely initiated screen capture can be automatically associated with a thread in the communications platform. This can be especially beneficial when a thread is curated around a particular project.

Likewise, similar benefits can be achieved in an education environment where a teacher can request a screen capture from a plurality of students, and the resulting screen captures can be automatically associated with student profiles for the teacher to review.

Furthermore, since the screen capture can be remotely configured, various options can be configured prior to receiving the screen capture request by a recipient user. This can ensure that the screen capture that is eventually received meets the necessary requirements for the context of the screen capture request.

These and other advantages will become more apparent throughout the following description.

In some embodiments, the disclosed technology is deployed in the context of a content management system having object synchronization capabilities and collaboration features, among others. An example system configuration 100 is shown in FIG. 1, which depicts content management system 110 interacting with client device 150.

Accounts

Content management system 110 can store objects in association with accounts, as well as perform a variety of object management tasks, such as retrieve, modify, browse, and/or share the object(s). Furthermore, content management system 110 can enable an account to access object(s) from multiple client devices.

Content management system 110 supports a plurality of accounts. A subject (user, group, team, company, etc.) can create an account with content management system, and account details can be stored in subject database 140. Subject database 140 can identify a registered subject by a subject ID, and store profile information for registered subjects in association with the subject ID. In some cases, profile information for registered subjects includes a subject name and/or email address. Subject database 140 can include account management information, such as account type (e.g. various tiers of free or paid accounts), storage space allocated, storage space used, client devices 150 having a registered content management client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 140 need not store complete information associated with an account for a subject. Some portion of information associated with an account for a subject can also be stored in another database of content management system 110 such as metadata database 146, or in a database external to content management system 110.

Subject database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 140 can be broken into a plurality of tables, indexes and other data structures.

Object Storage

A feature of content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 110 or in other content management systems, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in object directory 144. Additionally, data regarding changes, access, etc. can be stored in objects database 148. Objects database 148 can also include a subject account identifier that identifies the subject IDs that have access to the object.

In some embodiments, objects database 148 can be broken into a plurality of tables, indexes and other data structures.

Each of the various storages/databases such as object storage 142, object directory 144, objects database 148, and metadata database 146 can be comprised of more than one such storage or database and can be distributed over many devices and locations. Other configurations are also possible. For example, data from object storage 142, object directory 144, objects database 148, and/or metadata database 146 may be combined into one or more object storages or databases or further segmented into additional object storages or databases. Thus, content management system 110 may include more or less storages and/or databases than shown in FIG. 1.

In some embodiments, object storage 142 is associated with at least one object storage service 116, which includes software or other processor executable instructions for managing the storage of objects including, but not limited to, receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in object directory 144. Object directory 144 can include a content entry for each object stored in object storage 142. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 116 can output a unique hash for each different version of an object.

Object storage service 116 can also designate or record a parent of an object or a content path for an object in objects database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 142 in blocks and may not be stored under a tree like directory structure, such directory structure is a comfortable navigation structure for subjects viewing objects. Object storage service 116 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 142.

While the directory structure in which an account views objects does not correlate to storage locations of the objects at content management system 110, the directory structure can correlate to storage locations of the objects on client device 150 depending on the file system used by client device 150.

As addressed above, a content entry in object directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object, and object directory 144 can include a pointer or other mechanism to link the duplicates to the single copy.

Object storage service 116 can also store metadata describing objects, object types, folders, file path, and/or the relationship of objects to various accounts, collections, or groups in metadata database 146, in association with the object ID of the object.

Object storage service 116 can also store a log of data regarding changes, access, etc. in objects database 148. Objects database 148 can include the object ID of the object and can optionally include a description of the change or access action along with a time stamp or version number and any other relevant data. Objects database 148 can also include pointers to blocks affected by the change or object access. Object storage service 116 can also provide the ability to undo operations, by using an object version control mechanism that tracks changes to objects, different versions of objects (including diverging version trees), and a change history that can be acquired from objects database 148.

Object Synchronization

Another feature of content management system 110 is synchronization of objects with at least one client device 150. Client device(s) 150 can take different forms and have different capabilities. For example, client device 150 can be a computing device having a local file system accessible by multiple applications resident thereon. Client device 150 can be a computing device wherein objects are only accessible to a specific application or by permission given by the specific application, and the objects are typically stored either in an application specific space or in the cloud. Client device 150 can be any client device accessing content management system 110 via a web browser and accessing objects via a web interface. While example client device 150 is depicted in form factors such as a laptop, mobile device, or web browser, it should be understood that the descriptions thereof are not limited to devices of these example form factors. For example a mobile device might have a local file system accessible by multiple applications resident thereon, or might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices 150 are associated with an account of content management system 110, but in some embodiments client devices 150 can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (e.g., new, deleted, modified, copied, or moved objects) to objects in a designated location of a file system of client device 150.

Objects can be synchronized from client device 150 to content management system 110, and vice versa. In embodiments wherein synchronization is from client device 150 to content management system 110, a subject can manipulate objects directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content management storage service 116. In some embodiments, client synchronization service 156 can perform some functions of content management storage service 116 including functions addressed above such as dividing the object into blocks, hashing the object to generate a unique identifier, etc. Client synchronization service 156 can index content within client storage index 164 and save the result in client storage index 164. Indexing can include storing paths plus the object identifier, and a unique identifier for each object. In some embodiments, client synchronization service 156 learns the object identifier from server synchronization service 112, and learns the unique client identifier from the operating system of client device 150.

Client synchronization service 156 can use storage index 164 to facilitate the synchronization of at least a portion of the objects within client storage with objects associated with a subject account on content management system 110. For example, client synchronization service 156 can compare storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update objects database 148, metadata database 146, object directory 144, object storage 142, subject database 140, etc. as appropriate.

When synchronizing from content management system 110 to client device 150, data regarding a mount, modification, addition, deletion, move of an object recorded in objects database 148 can trigger a notification to be sent to client device 150 using notification service 117. When client device 150 is informed of the change, client device 150 can make a request for changes listed in objects database 148 since the last synchronization point known to the client device. When client device 150 determines that it is out of synchronization with content management system 110, client synchronization service 156 requests object blocks including the changes, and updates its local copy of the changed objects.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remainder portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

While the synchronization embodiments addressed above referred to client device 150 and a server of content management system 110, it should be appreciated by those of ordinary skill in the art that a user account can have any number of client devices 150 all synchronizing objects with content management system 110, such that changes to an object on any one client device 150 can propagate to other client devices 150 through their respective synchronization with content management system 110.

Collaboration Features

Another feature of content management system 110 is to facilitate collaboration between subjects. Collaboration features include object sharing, commenting on objects, co-working on objects in real time, instant messaging, providing presence and "seen" state information regarding objects, etc.

Sharing

Content management system 110 can manage sharing objects via sharing service 128. Sharing an object by providing a link to the object can include making the object accessible from any computing device in network communication with content management system 110. However, in some embodiments a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of subject accounts.

To share an object within content management system 110 sharing service 128 can add associate a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed. In some embodiments, objects can inherit access rights from another object such as ancestor objects.

To share objects outside of content management system 110, sharing service 128 can generate a custom network address, such as a uniform resource locator (URL), which allows any web browser to access the object or collection in content management system 110 without any authentication. To accomplish this, sharing service 128 can include content identification data in the generated URL, which can later be used to properly identify and return the requested object. For example, sharing service 128 can include a token identifying an object ID and optionally a subject ID in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject and the contributing subject can upload an object to the first subject's subject account using the URL.

Team Service

In some embodiments content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Teams service 130 can provide a common shared space for the team, private subject account folders, and access limited shared folders. Teams service 130 can also provide a management interface for an administrator to manage collections and objects within team, and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 can authenticate a subject account. For subject accounts with multiple levels of rights (e.g. a subject account with subject rights and administrator rights) IAM service 132 can also facilitate explicit privilege escalation to avoid unintentional actions by administrators.

Object Access

Object storage service 116 can receive a token from client application 152 that follows a request to access an object and can return the capabilities permitted to the subject account.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notifications service 117 when client device 150 is accessing the object. Notifications service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and objects database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject letting them know that they have been mentioned in the comment. Various other object events can trigger notifications, including deleting an object, sharing an object, etc.

Collaboration service 126 can also provide a messaging platform whereby subjects can send and receive instant messages, voice calls, emails, etc.

Collaboration Objects

In some embodiments content management service can also include collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.

Collaboration Companion Interface

In some embodiments client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by content application 152, the native application may not provide any native way to display the above addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a standalone application 152, one or more application plug-ins, and/or a browser extension. However, the subject can also interact with content management system 110 via a third-party application, such as a web browser, that resides on client device 150 and is configured to communicate with content management system 110. In various implementations, the client-side application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for the multiple accounts. In some embodiments, each account can appear as a folder in a file system, and all objects within that folder can be synchronized with content management system 110. In some embodiments, client application 152 can include a selector to choose one of the multiple accounts to be the primary account or default account.

In some embodiments, content management system 110 can include remote capture service 136. Remote capture service 136 can be used to configure a capture request where the capture will be executed at a remote client device using a web browser. The resulting capture object can be stored by object storage service 116 at a location configured by remote capture service 136.

Third Party Services

In some embodiments content management system 110 can include functionality to interface with one or more third-party services such as workspace services, email services, task services, etc. In such embodiments, content management system 110 can be provided with login credentials for a subject account at the third party service to interact with the third party service to bring functionality or data from those third party services into various subject interfaces provided by content management system 110.

While content management system 110 is presented with specific components, it should be understood by one skilled in the art that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
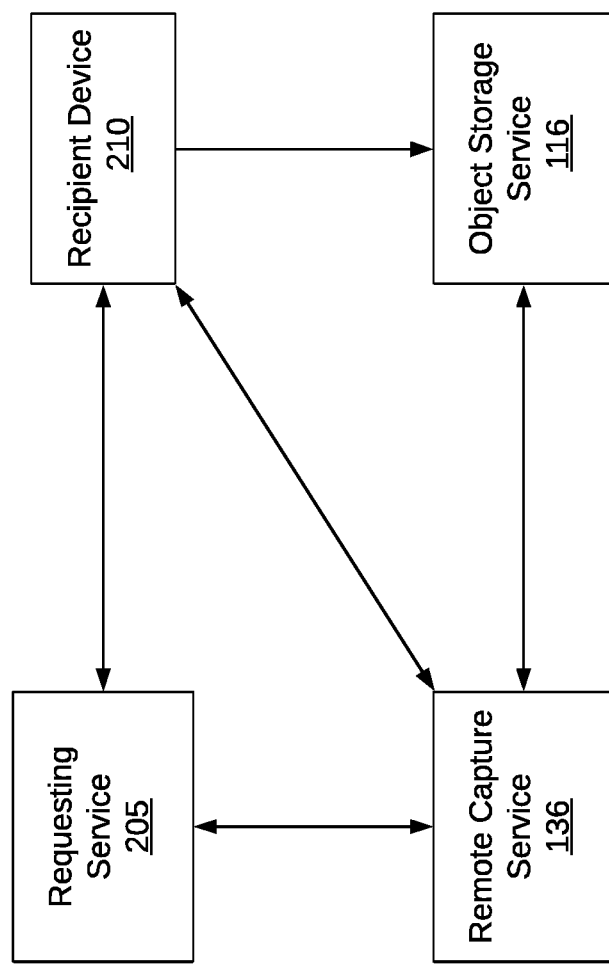
FIG. 2 illustrates an example system for creating a remote capture request and causing a client device to carry out the capture according to parameters configured as part of the capture request in accordance with some aspects of the present technology.

FIG. 2 illustrates an example system for creating a remote capture request and causing client device 150 to carry out the capture according to parameters configured as part of the capture request.

FIG. 2 illustrates remote capture service 136. Remote capture service 136 provides remote capture requests as a service, wherein a requesting user can interact with remote capture service 136 to configure a remote capture request to be sent to a recipient user at a recipient device. In some embodiments, remote capture service 136 can be a standalone service interfacing with content management system 110 via one or more application programming interfaces (APIs), while in some embodiments, remote capture service 136 can be integrated with content management system 110 as a service provided by content management system 110.

Whether remote capture service 136 is a service provided by a content management system 110 or as a standalone service, remote capture service 136 can be integrated with requesting service 205. Remote capture service 136 can be integrated with requesting service 205 by way of a specifically built integration or by way of requesting service 205 interacting with remote capture service 136 using one or more APIs. Additionally, a user could navigate to a web page or app provided by the remote capture service to configure and sent a remote capture request to a recipient user.

Requesting service 205 can be configured to provide an interface for configuring a remote capture request. Once the remote capture request is configured, requesting service 205 can utilize remote capture service 136 to provide a link that is specific to the configured capture request. The requesting service 205 or remote capture service 136 can send the link to the capture request to recipient device 210.

In some embodiments, recipient device 210 can be a client device 150. Although, it is not required that the recipient device 210 have client application 152 installed in order to perform the features of the present technology.

Once received by recipient device 210, a recipient user operating recipient device 210 can click on the link for the remote capture request. The link can cause recipient device 210 to request a web page using an Internet browser that can be provided by remote capture service 136. The Internet browser on recipient device 210 can load the web page provided by remote capture service 136. The web page provided by remote capture service 136 can include code effective to interact with the web browser to initiate a capture on recipient device 210.

The capture can be a screenshot, camera video recording, camera photo, screen video recording, audio recordings, or GIF, or any combination of the these. For example, the capture request can be configured to cause recipient device 210 to take a screenshot of a window displayed on recipient device 210 or to create a video from recording a screen of recipient device. The capture request can be configured to cause recipient device 210 use a camera to record a video or a still image. The capture request can be configured to cause recipient device 210 use a microphone to record audio. The capture request can be configured to cause recipient device 210 to utilize any hardware or software user interface devices to capture audiovisual information and store it in a capture object.

Figure 6A:
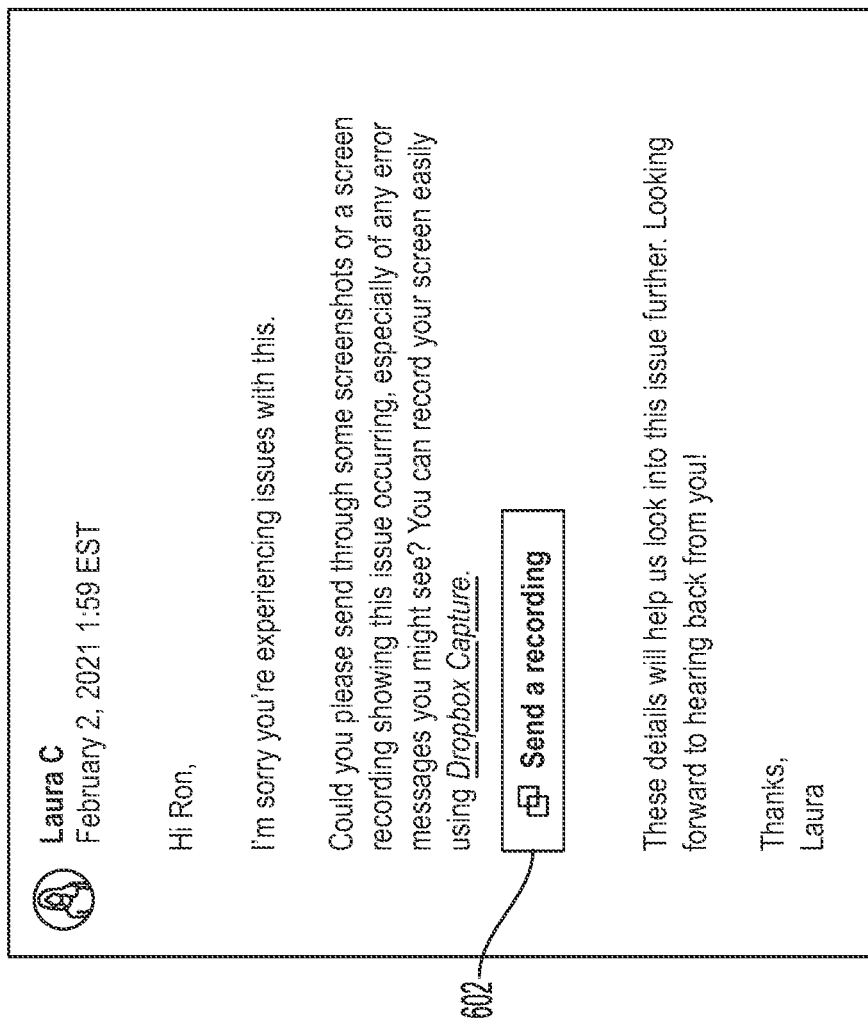
FIG. 6A illustrates an example of a request for the media capture in accordance with some aspects of the present technology.
Figure 6B:
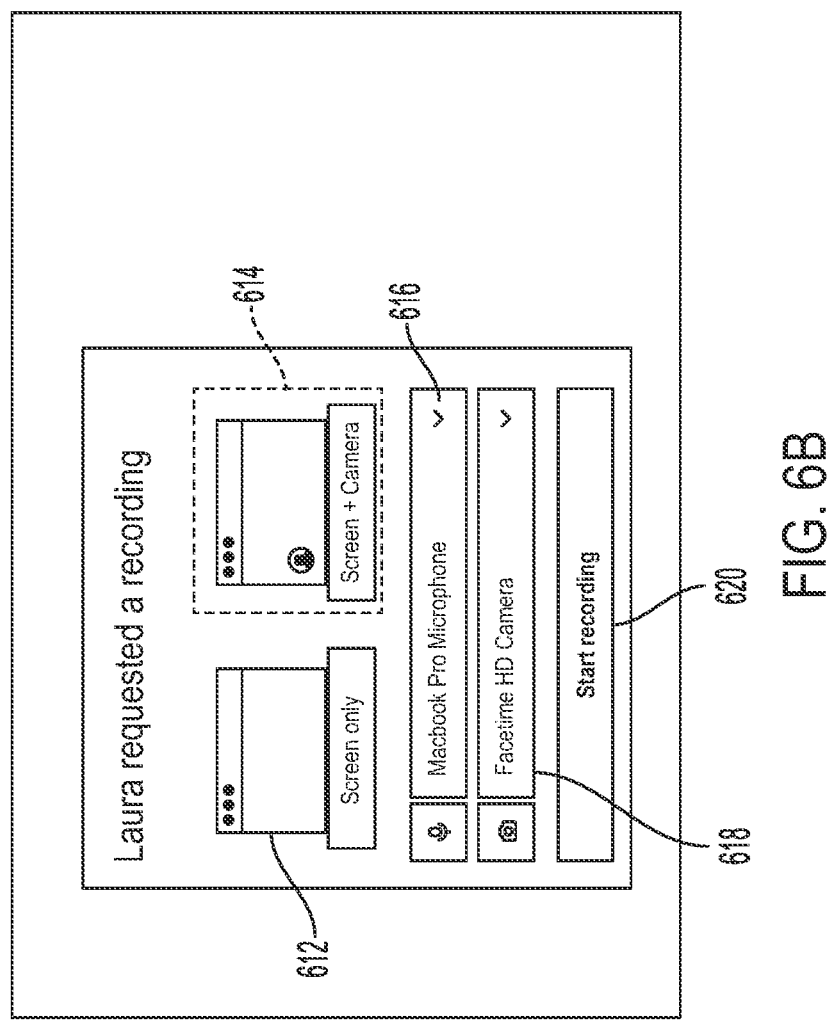
FIG. 6B illustrates an example of a user interface showing options that a recipient user can select in accordance with some aspects of the present technology.
Figure 6C:
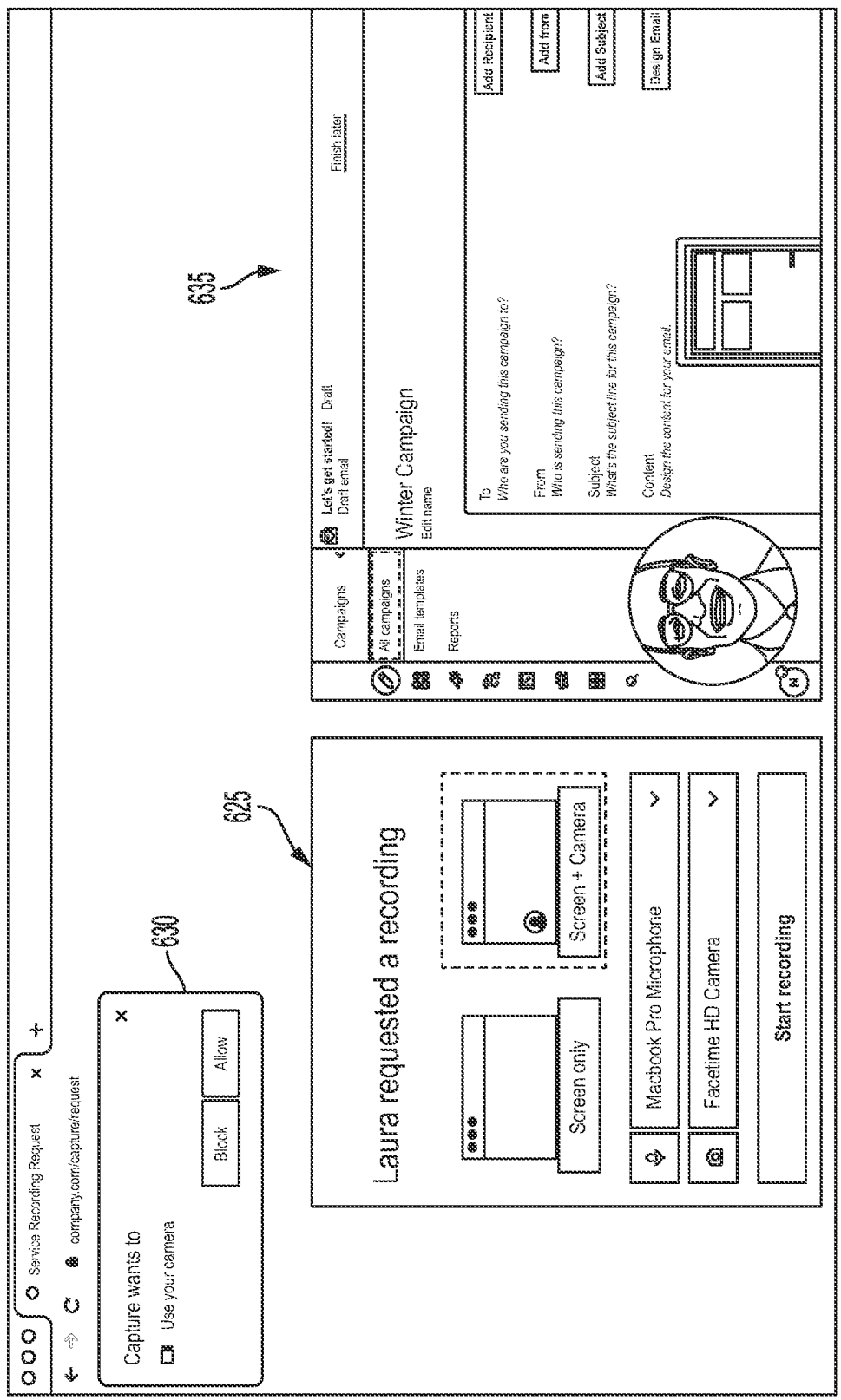
FIG. 6C illustrates an example of a user interface showing a permission request in accordance with some aspects of the present technology.
Figure 6D:
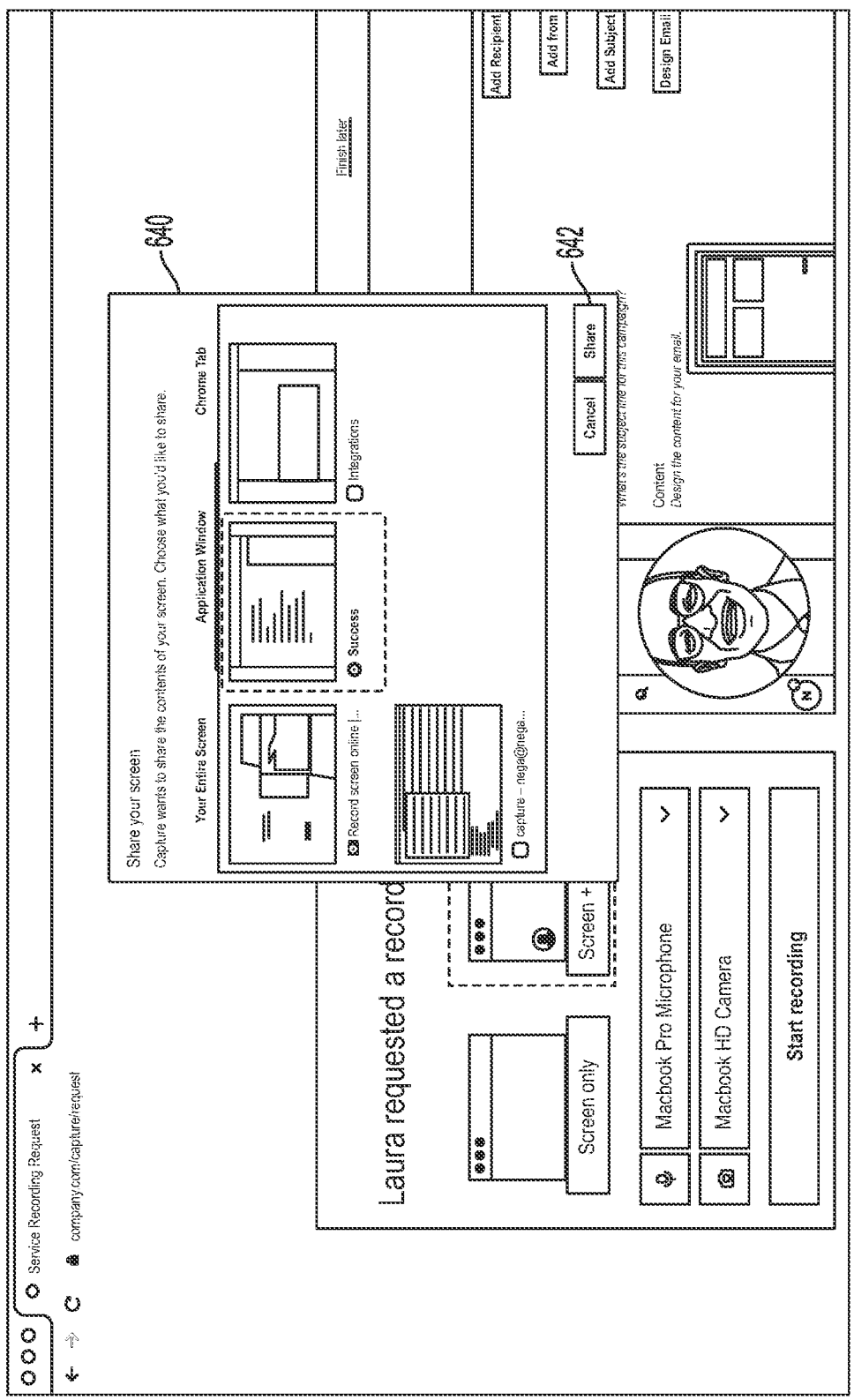
FIG. 6D illustrates an example of a user interface showing options regarding which window or screen to capture in accordance with some aspects of the present technology.
Figure 6E:
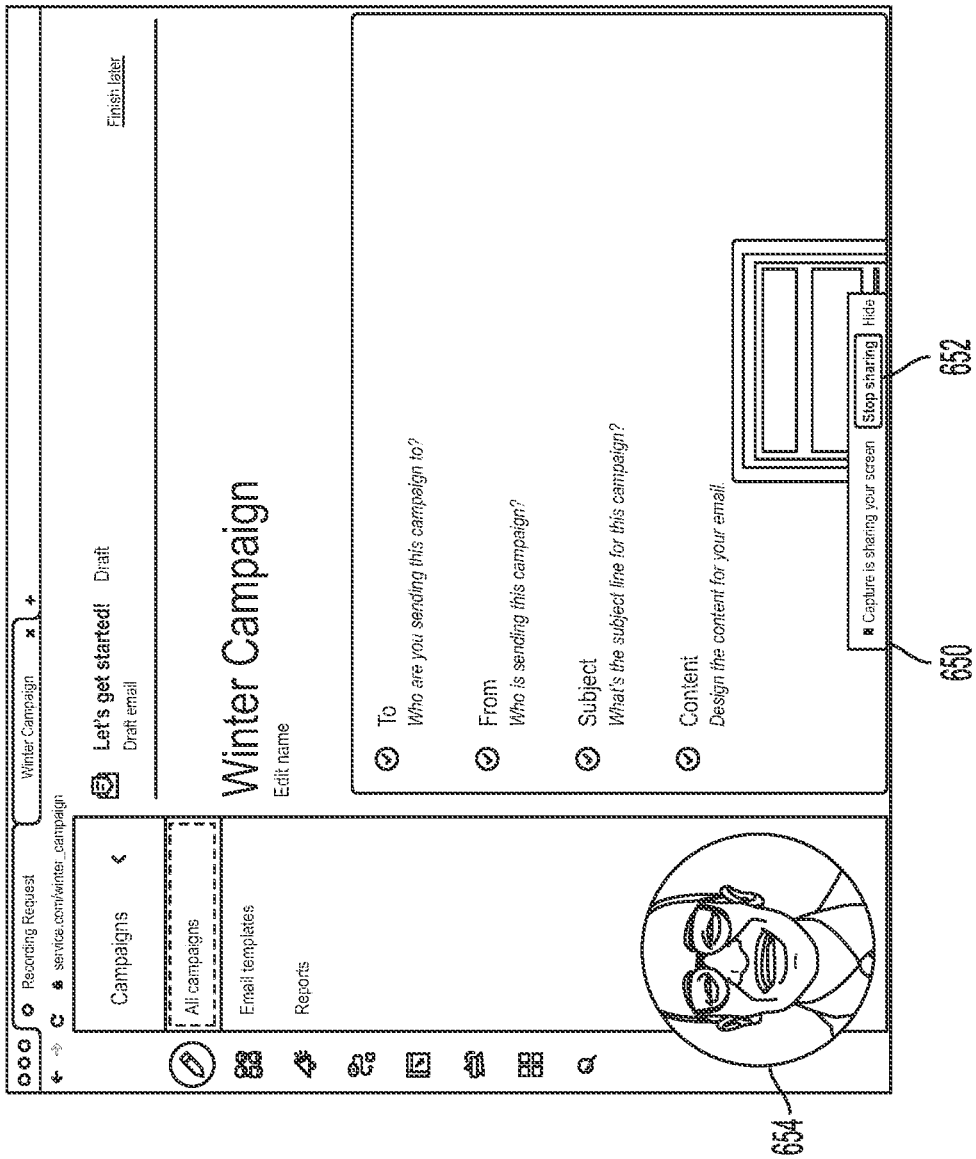
FIG. 6E illustrates an example of a user interface while the capture is ongoing, and a button to stop the recording in accordance with some aspects of the present technology.

Once the capture is completed, recipient device 210 can send a capture object that includes data descriptive of the capture to be stored at object storage service 116. For example, the capture object can be a video file including a screen recording, a camera recording, or a combined screen recording and camera recording (e.g., as illustrated in FIG. 6E). The capture object can be an image file including a still image from a camera, or a screenshot of the display of the recipient device 210. The capture object can be an audio file including audio captured using a microphone or sound card of recipient device 210.

While object storage service 116 is depicted as being part of content management system 110, it should be appreciated by those of ordinary skill in the art that object storage service 116 can be part of any network accessible storage. Remote capture service 136 can then access the capture object at object storage service 116 and provide the object to requesting service 205. And in some embodiments, providing the capture object to requesting service 205 can be by way of a shared link or a shared folder.

Figure 3:
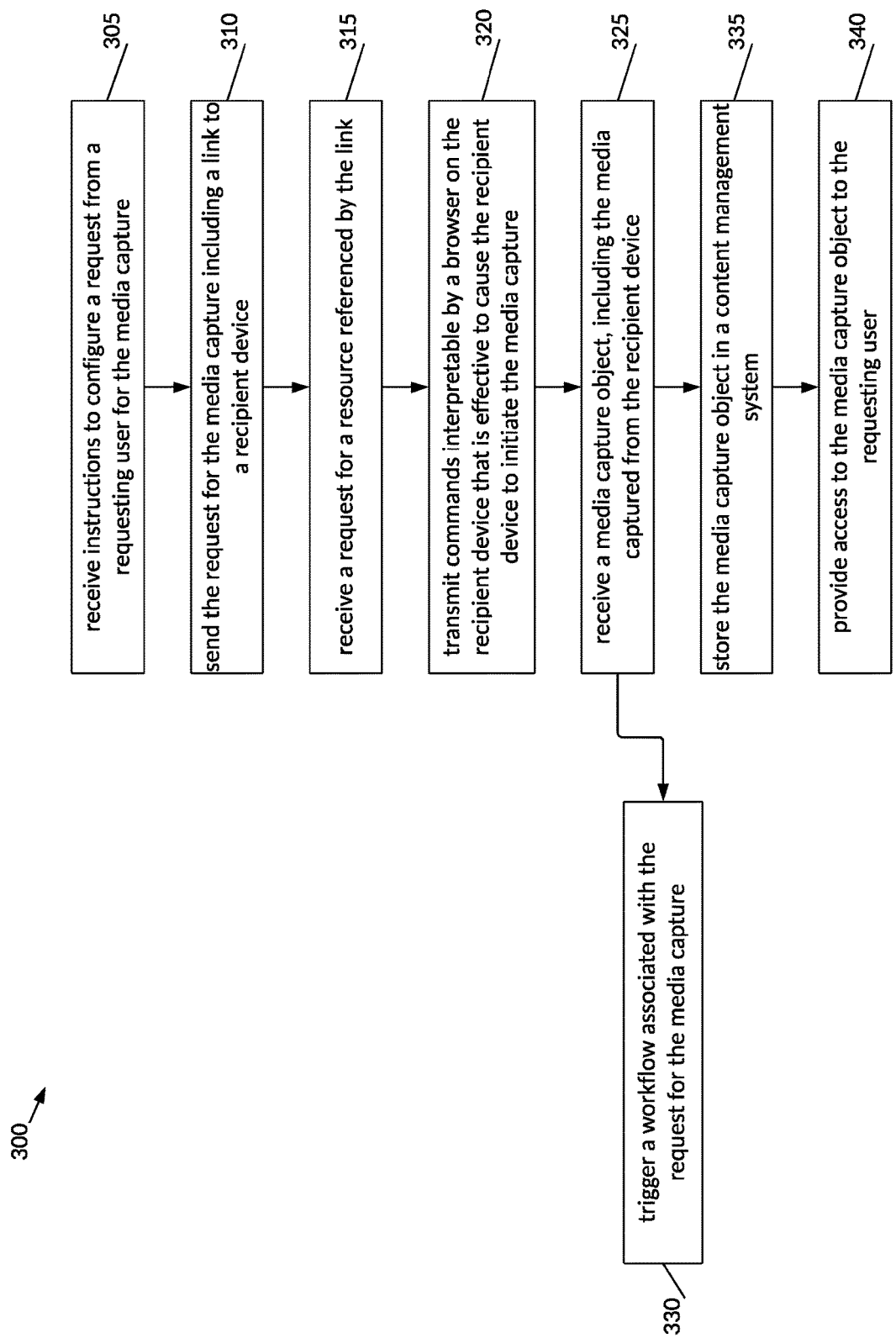
FIG. 3 illustrates an example method for remotely initiating a capture request in accordance with some aspects of the present technology.

FIG. 3 illustrates an example method 300 for remotely initiating a capture request. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

The present technology can be in the context of a technical support environment. For example, a user operating recipient device 210 can be communicating with a technical support representative at requesting service 205. The technical support representative can determine that it would be useful to have a screen capture from recipient device 210 demonstrating the issue that the user operating recipient device 210 is experiencing. In such a context, the technical support representative at requesting service 205 can request the capture from recipient device 210.

The present technology can also take place in the context of an educational setting wherein an instructor interacting with requesting service 205 may want to receive a capture from a student operating recipient device 210 to demonstrate work product or some learned skill. In such a context, the instructor at requesting service 205 can request the capture from recipient device 210.

The present technology can also occur in the context of an organization structure wherein a team leader interacting with requesting service 205 may want to receive a capture from a team member operating recipient device 210 that demonstrates progress, or a question related to a task that the team is working on. In such a context, the team leader at requesting service 205 can request the capture from recipient device 210.

The present technology can take place in other contexts as well. The contexts described above are merely representative examples.

According to some embodiments, the method includes receiving instructions to configure a request from a requesting user for the media capture at block 305. For example, the remote capture service 136 may receive instructions to configure the request for the media capture from the requesting user.

The requesting user can be interacting with requesting service 205, which can be, for example, a customer support service (such as ZENDESK or customer support specific to any other service), an IT ticket service (such as JIRA), an educational platform (GOOGLE CLASSROOMS, or BLACKBOARD), a workflow platform (such as TRELLO), or a communication platform (such as email, instant messaging, workspace tools such as SLACK), etc. The above are merely examples provided for context and should not be considered limiting examples of the requesting service 205.

In some embodiments, the instructions to configure the request for the media capture from the requesting user can take the form of the requesting user selecting an option provided by remote capture service 136 within the requesting service 205 to send the capture request.

In some embodiments, the requesting service 205 can include the remote capture service 136 as part of the requesting service. In some embodiments, the remote capture service 136 is a standalone service or is part of content management system 110 (as illustrated in FIG. 1), and the requesting service interacts with the remote capture service 136 through a purpose-built integration (e.g., an App) or one or more public APIs. In some embodiments, the requesting service 205 can present an option to utilize remote capture service 136. The option to utilize the remote capture service can launch an interface to configure the remote capture request.

Regardless of where the remote capture service 136 is located, the requesting user can interact with remote capture service 136 to configure the capture request. The requesting user can configure the capture request by at least choosing the recipient of the capture request, but may include configuring additional options too. Such additional options can include the type of capture, such as whether to capture a screenshot, camera video recording, camera photo, screen video recording, audio recordings, or GIF, or any combination of the these. The additional options can include a location to store the media capture object, whether the media capture should include a screen capture and/or a video capture, a length of the media capture, etc. In some embodiments, additional options can include linking the capture request to a workflow, whereby the workflow is triggered when the media capture object is received. The request for the media capture can further be configured to begin streaming the media capture to the requesting user after the media capture begins. The request for the media capture can also be configured with a time-to-live (TTL) which will limit a period in which an object storing the capture will remain accessible or stored.

According to some embodiments, the method includes sending the request for the media capture to a recipient device of a recipient user at block 310. For example, the remote capture service 136 may send the request for the media capture to a recipient device 210 of a recipient user. The request for the media capture can be a link included in a communication thread between the requesting user and the recipient user. For example, the link can be sent in an ongoing chat thread, an email, or other communication service. The link can be send directly by the requesting user, or it can be sent by requesting service 205, or the remote capture service 136.

The link can include an embedded token identifying attributes of the request for the media capture. For example, the attributes of the request can be at least an identification of the specific request for the media capture. The attributes can further include an identification of the communication thread in which the link was included.

After receiving the link, the recipient user at recipient device can click on the link, which can cause a web browser of the recipient device 210 to request the resource reference by the link from the remote capture service 136.

According to some embodiments, the method includes receiving the request for the resource referenced by the link at block 315. For example, the remote capture service 136 may receive the request for the resource referenced in the token embedded by the link. In some embodiments, the resource referenced by the link can be a website that includes instructions for both the recipient user and the recipient device 210 for carrying out the capture request.

According to some embodiments, the method includes transmitting commands interpretable by a browser on the recipient device that is effective to cause the recipient device to initiate the media capture at block 320. For example, the remote capture service 136 may transmit commands interpretable by a browser on recipient device 210 that is effective to cause recipient device 210 to initiate the media capture. As noted above, the commands can be included in a website referred to be the link. The commands can be interpretable by the browser and can include one or more calls to a browser application programming interface (API) that can initiate the media capture.

As will be described further with respect to FIG. 5, the recipient device 210 can be configured to initiate the capture by the commands received from the remote capture service 136, and the recipient device 210 can perform the requested capture and save the capture.

After the capture has been initiated or completed, the method includes receiving a media capture object at block 325. For example, the remote capture service may receive the media capture object from recipient device 210. The media capture object can be one or more files containing the data making up the media captured by recipient device 210.

According to some embodiments, if the request for media capture included a configured option to link a workflow to the capture request, the method includes triggering a workflow associated with the request for the media capture at block 330. For example, the remote capture service 136 may trigger a workflow associated with the request for the media capture. For example, the workflow could alert the requesting user or another user that the media capture is available and can progress a project related to the media capture. For example, a technical support session can be progressed, or a work task can be progressed according to the terms of the linked workflow. In such embodiments, remote capture service 136 can trigger the workflow, which may be defined at another service, once the capture option has been at least partially received.

According to some embodiments, the method includes storing the media capture object in a content management system at block 335. For example, the remote capture service 136 may store the media capture object to a location in a content management system 110, which may be handled by object storage service 116. Alternatively, the recipient device 210 can send the capture object directly to the content management system 110. The token embedded in the link to request the capture object, or the webpage loaded as a result of the link, can inform the recipient device 210 of a location at the content management system 110 to store the capture object and can provide the recipient device 210 or the capture object itself, with the necessary permissions to store the capture object at the specified location within the content management system 110.

The location in the content management system may be specified by the requesting user when configuring the request for the media capture. In some embodiments, the location in the content management system is a shared folder. The shared folder can be shared with team members that include the requesting user. Optionally, the shared folder can be shared with the recipient user and the requesting user.

In some embodiments, the media capture object can be associated with a TTL. The TTL can be set as part of the capture request configuration options, or can be set by the recipient user, or can be a policy set on a folder in which the capture object is stored. The media capture object can be deleted or become inaccessible to the requesting user after the TTL expires.

According to some embodiments, the method provides access to the media capture object to the requesting user at block 340. For example, the remote capture service 136 may provide access to the media capture object to the request user. The remote capture service 136 can notify the requesting user when the media capture object is received. The notification can include a link to access the media capture object at the location in which it is stored. In some embodiments, the notification can be sent to the requesting user and/or the recipient user. In some embodiments, the notification may only need to inform the requesting user that the capture object is stored in an accessible location, such as a folder in content management system 110.

In some embodiments, the remote capture service 136 can associate the capture object with data at the requesting service 205. For example, the remote capture service can associate the capture object with a particular ticket associated with a technical support request, or with a student ID, or with a project code name, or communication thread, etc.

In some embodiments, the notification that provides access to the media object can be an email, such as an email thread between the requesting user and the recipient user. In some embodiments, the notification can be messaging thread as part of a website or a communications service for instant messages or group spaces.

Figure 4:
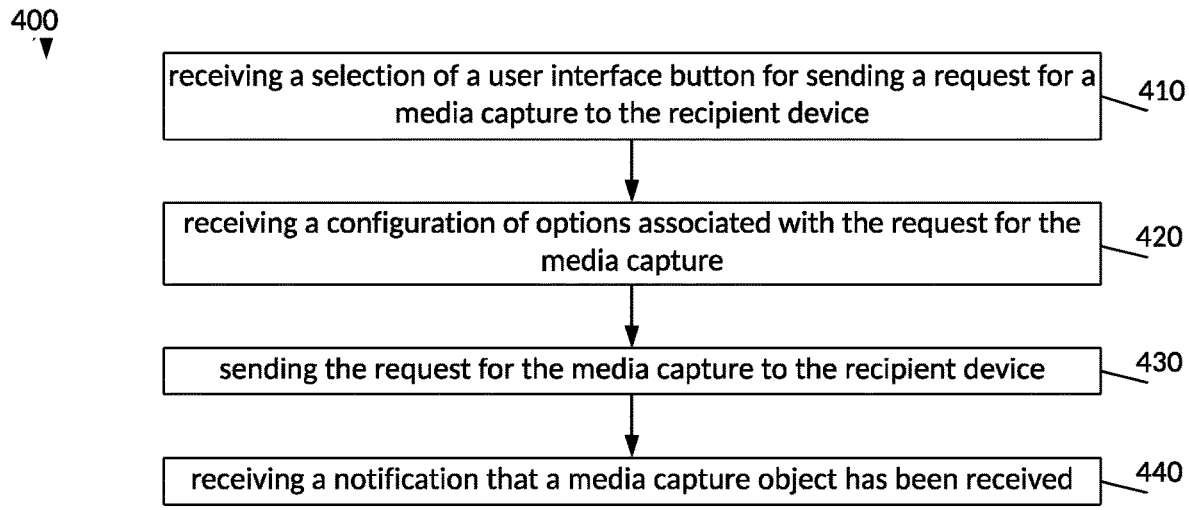
FIG. 4 illustrates an example method for configuring and initiating a remote capture request by a user interface available through the requesting service in accordance with some aspects of the present technology.

FIG. 4 illustrates an example method 400 for configuring and initiating a remote capture request by a user interface available through requesting service 205. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method includes receiving a selection of a user interface button to send a request for a media capture to the recipient device at block 410. For example, the requesting service 205 may present a user interface button to configure and send a media capture request. The requesting service 205 can receive a selection of the user interface button to send the request for a media capture to the recipient device 210. In some embodiments, the user interface button is included in a messaging interface being used by the requesting user to communicate with a recipient user who is accessible at the recipient device 210.

The method further includes receiving a configuration of options associated with the request for the media capture at block 420. For example, prior to sending the request, the requesting service 205 may receive a configuration of options associated with the request for the media capture. The configuration of options can include a location to store the media capture object, whether the media capture includes a screenshot, camera video recording, camera photo, screen video recording, audio recordings, or GIF, or any combination of the these, a length of the media capture, etc. The configuration of options can include a location in a content management system where the media content object should be stored after the media capture by the recipient device. The options can include configuring the link to access the media capture object to be included in a workflow. The configuration of options can include entering a name for the recording. The options can include configuring a time-to-live (TTL) to be associated with the media capture object, whereby the media capture object is deleted or becomes inaccessible to the requesting user after the TTL expires.

According to some embodiments, the method includes sending the request for the media capture to the recipient device at block 430. For example, the requesting service 205 may send the request for the media capture to the recipient device 210.

The receiving user can click on the request for the media capture at the recipient device. As will be explained in greater detail with respect to FIG. 5 below, the recipient device can capture content as configured by the requesting service 205 and send a capture object to object storage service 116 or to remote capture service 136.

According to some embodiments, the method includes receiving a notification that a media capture object has been received in response to the request for the media capture object at block 440. For example, the requesting service 205 may receive a notification that a media capture object has been received in response to the request for the media capture object. The notification can include a link to access the media capture object. In some embodiments, the link can point to the media capture object stored at the content management system 110.

In some embodiments, the remote capture service 136 can associate the capture object with data at the requesting service 205. For example, the remote capture service 136 can associate the capture object with a particular ticket associated with a technical support request, or with a student ID, or with a project code name, or communication thread, etc.

Figure 5:
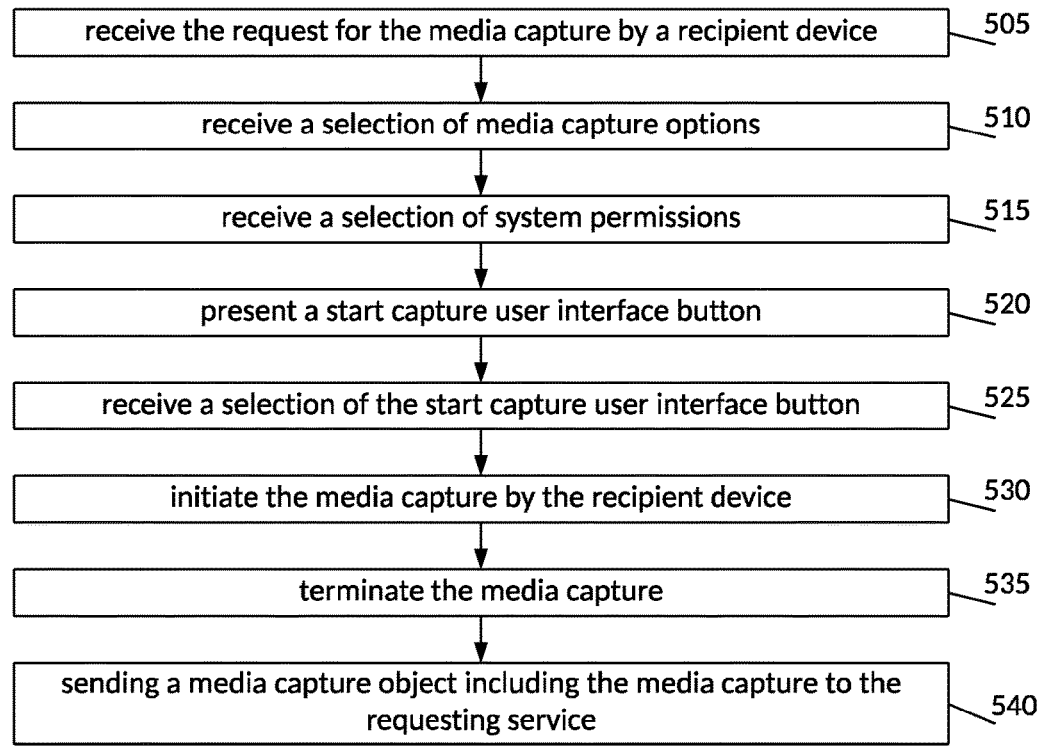
FIG. 5 illustrates an example method for receiving a remotely initiated capture request and performing the capture on a recipient device in accordance with some aspects of the present technology.

FIG. 5 illustrates an example method 500 for receiving a remotely initiated capture request and performing the capture on a recipient device 210. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method includes receiving the request for the media capture by a recipient device of a recipient user at block 505. For example, the recipient device 210 may receive the request for the media capture. The request for the media capture can originate from the remote capture service 136 or the requesting service 205. An example of a request for the media capture is illustrated in FIG. 6A.

In some embodiments, the request for the media capture is a link received in a messaging platform. The recipient user can click on the link, and the recipient device 210 can receive the user input selecting the link. When activated by the user input selecting the link, the link can cause the recipient device to display a web interface, such as a web page or a popup, with the request for the media capture. The recipient user does not need to identify a capture recording application on the recipient device.

In some embodiments, the method illustrated in FIG. 5 can skip directly to step 525 and 530, wherein the media capture can be initiated as configured by the requesting user. However, in some embodiments, the recipient user may be presented with additional options, or may be presented with a user interface to confirm some options selected by the recipient user.

The web interface can provide further options regarding the capture request. In some embodiments, some options have been pre-configured by the requesting user. For example, the options can include a requirement to have a camera on, a location to store the media capture object, whether the media capture includes a screenshot, camera video recording, camera photo, screen video recording, audio recordings, or GIF, or any combination of the these, a length of the media capture, etc.

According to some embodiments, the method includes receiving a selection of media capture options prior to receiving the selection of the start capture user interface button at block 510. For example, the recipient device may receive a selection of media capture options prior to receiving the selection of the start capture user interface button. While some options can be pre-configured by the requesting user, the recipient user can also select options. Some options may not have been pre-configured, or the recipient user might override the pre-configured options by de-selecting the option. In some embodiments, the user options can include the same options that are provided to the requesting user. In some embodiments, there are options that are specific to the recipient user. For example, the recipient user can make a selection of a window or screen to capture. An example of a user interface showing some options that can be selected is illustrated at FIG. 6B. An example of a user interface showing options regarding which window or screen to capture is illustrated at FIG. 6D. Examples of the start capture user interface button include button 620 in FIG. 6B, or button 642 in FIG. 6D.

According to some embodiments, the method includes receiving a selection of system permissions to permit a web interface to have access to a camera or to screen capture a window at block 515. For example, the recipient device 210 may receive a selection of system permissions to permit a web interface to have access to a camera, a microphone, and/or a window to capture. The recipient device or operating system executing thereon may require the web interface to explicitly request permission or otherwise have the recipient user's permission before starting a media capture. An example of a user interface showing such a permission request is illustrated at FIG. 6C.

According to some embodiments, the method includes presenting a start capture user interface button in response to the received request for the media capture at block 520. For example, the recipient device may present a start capture user interface button that is presented in response to the received request for the media capture.

According to some embodiments, the method includes receiving a selection of the start capture user interface button at block 525. For example, the recipient device 210 may receive a selection of the start capture user interface button. Examples of the start capture user interface button include button 620 in FIG. 6B, or button 642 in FIG. 6D.

According to some embodiments, the method includes initiating the media capture by the recipient device after receiving the selection of the start capture user interface button at block 530. For example, the recipient device 210 may initiate the media capture by the recipient device after receiving the selection of the start capture user interface button. The recipient user does not need to identify an application to do the recording, and many of the available options can be pre-configured by the requesting user. Thus, it is easy for the recipient user to navigate any provided menus of options and start the capture in response to the capture request with minimal effort.

According to some embodiments, the method includes terminating the media capture at block 535. For example, the recipient device 210 may terminate the media capture in response to an expiration of a timer, or in response to the recipient user clicking a user interface button to stop the recording. An example of a user interface button to stop the recording is illustrated in FIG. 6E.

Figure 6F:
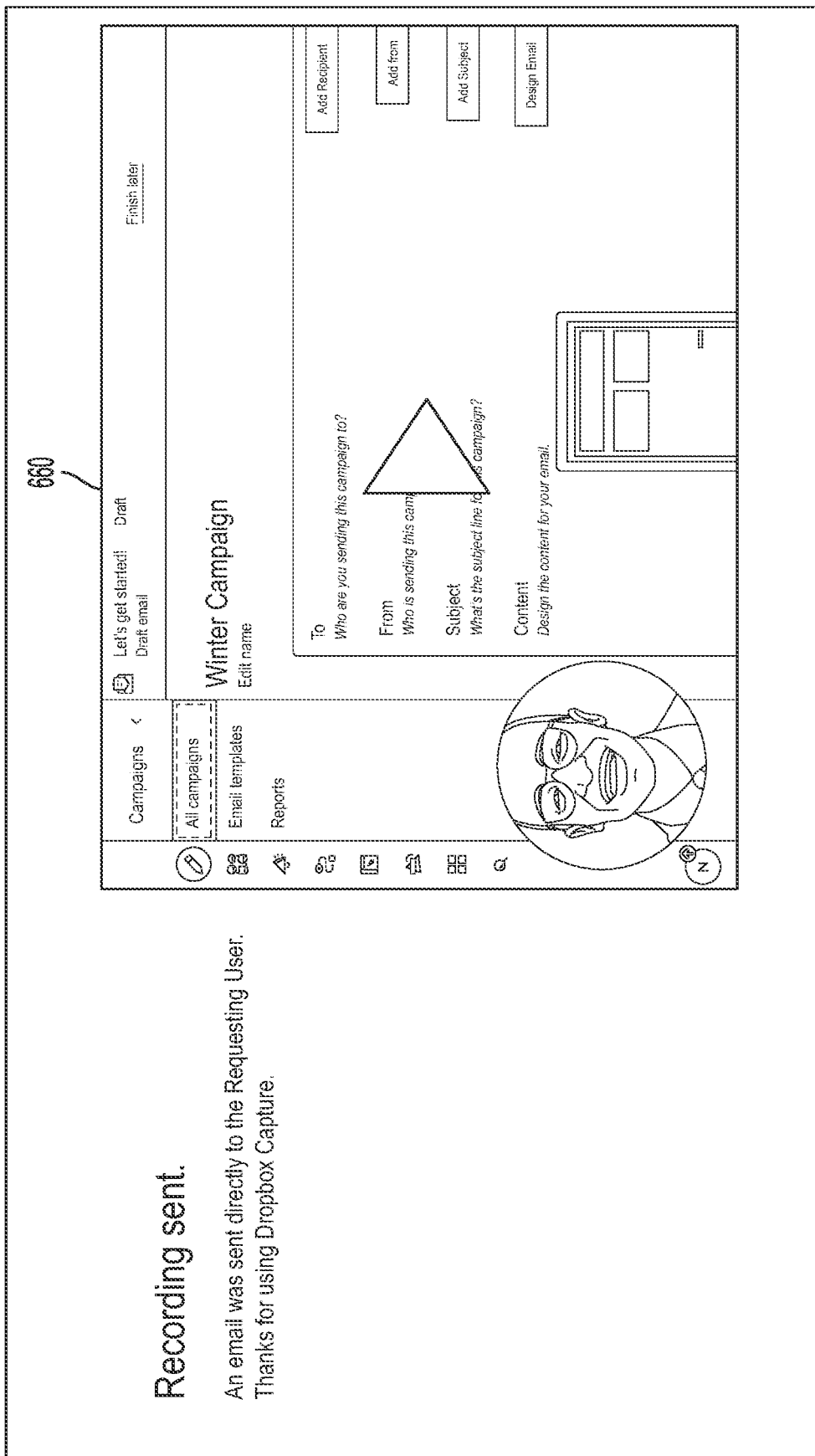
FIG. 6F illustrates an example of a user interface after the recording is sent in accordance with some aspects of the present technology.

According to some embodiments, the method includes sending a media capture object including the media capture to the requesting service at block 540. For example, the recipient device 210 may automatically send a media capture object including the media capture to the requesting service 205. In some embodiments, sending a media capture object, including the media capture, to the requesting service 205 includes sending the media capture object to the requesting user. An example of a user interface after the recording is sent is illustrated in FIG. 6F. The sending of the media capture object can occur without further recipient user involvement. Thus, the recipient user does not need to figure out how to send a large file, or even figure out where the media capture object has been saved. The whole process can occur with minimal user involvement and can be more efficient on recipient device 210 because the recipient device does not need to store a copy after it has been transmitted.

In another example of sending a media capture object at block 540, the method includes storing the media capture object to object storage service 116 or a location in a content management system 110. For example, the recipient device 210 may store the media capture object to a location in content management system 110. The capture object can even be streamed in chunks to the content management system 110.

Throughout the method illustrated in FIG. 5, the recipient user did not need to identify a capture recording application on recipient device 210, and some options may even have been chosen for them. In addition to these convenient features, the recipient user did not need to take any actions to save the capture object that resulted from the captured recording, and the recipient user did not need to take any steps to send the capture object to the requesting service 205 or requesting user.

FIGS. 6A, 6B, 6C, 6D, 6E, and 6F illustrate a series of user interfaces displayed by the recipient device, including an interface for receiving a capture request, interfaces for progressing through the capture request, and an interface for sending the capture request to the requesting user.

FIG. 6A illustrates an example of a request for the media capture. More specifically, FIG. 6A illustrates a messaging interface showing a communication coming from a requesting user to a recipient user where the requesting user has included a capture request 602. Capture request 602 can be displayed in the form of a selectable user interface button. The recipient user can select the user interface button for the capture request 602, which can cause recipient device 210 to open a web page related to the capture request.

FIG. 6B illustrates an example of a user interface showing options that can be selected by a recipient user. After the recipient user has selected the user interface button for the capture request 602, an Internet browser on recipient device 210 can open a web page that can be used to initiate the capture. FIG. 6B illustrates an example of a few options that could be illustrated on the webpage that can be used to initiate the capture. In some embodiments, the requesting user may have preconfigured selections of some of these options. For example, in FIG. 6B the requesting user may have preconfigured the capture request to record both a screen displayed on recipient device 210 and a video of the recipient user using the camera on the recipient device 210. This can be determined because the option for "screen+camera" 614 is already selected.

In some embodiments, the recipient user may make alternative selections even if the requesting user has requested certain options. In some embodiments, the requesting user may not have configured any of these options, and some of the options must be selected by the recipient user. FIG. 6B provides options to choose whether to record a "screen only" 612, which would record the screen of recipient device 210, or to record the "screen+camera" 614 as described above. Additionally, the recipient user can select a source of audio using 616. The user can also select a source of video 618. Once the recipient user has selected the desired options, the user can select the user interface button 620 to start recording.

In some embodiments, a selection of the start recording user interface button 620 can begin a capture of the entire screen of the recipient device. In some embodiments, a selection of the start recording user interface button 620 can progress to further user interfaces to give permissions and/or to select specific screens or windows for recording.

FIG. 6C illustrates an example of a user interface showing a permission request. In some embodiments, recipient device 210 may require that the recipient user confirm that the web browser application performing the capture is authorized to perform the capture. This may take the form of providing the web browser with permissions to record other windows on recipient device 210, use a microphone of recipient device 210, or request permission for the browser to use the camera to record the video 630 of the recipient user.

FIG. 6C also shows a browser window showing the options 625 addressed with respect to FIG. 6B. FIG. 6C also shows an example window 635 that illustrates how the capture request might appear when combined with a recording of the recipient user.

FIG. 6D illustrates an example of a user interface showing options regarding which window or screen to capture. For example, when recipient device 210 has multiple applications, windows, or tabs open in an Internet browser, it can display a popup window or modal 640 providing the recipient user with options to choose what content to record. For example, the user could choose to record their entire screen or record just a particular application window or a particular tab of an Internet browser. Once the desired option is selected, the user can initiate the capture request by selecting the user interface button 642.

FIG. 6E illustrates an example of a user interface while the capture is ongoing and a button to stop the recording. While the capture is ongoing, the user will see the display of recipient device 210 as normal except that an additional user interface component 650 indicating that the capture is occurring can be displayed above the other content on the display. During the capture, the recipient user can interface with recipient device 210 to demonstrate whatever technical support issue, project progress, or whatever else they desire to demonstrate to the requesting user.

During this demonstration, the view 654 of the recipient user may include a portion of the screen. If the view 654 of the recipient user gets in the way of the demonstration, the recipient user can interact with the recipient device 210 to select and drag the recipient view 654 to another location on the screen.

Once the recipient user has completed their demonstration, they can select user interface button 652 to end the sharing.

FIG. 6F illustrates an example of a user interface after the recording is sent. Additionally, the recipient user may be able to click on top of an image of a frame of the capture request 660 that is displayed in the user interface to review the recording of the screen capture. In some embodiments, rather than displaying an image from the capture request 660, the user interface may provide a link to the capture object.

While FIGS. 6A-6F show an example of user interfaces used for a received capture request and only show options for a screen capture or screen capture+video, it should be understood that other capture options are possible. For example, the capture request can be a request for a screenshot, camera video recording, camera photo, screen video recording, audio recordings, GIF, or any combination of these.

As addressed above, the requesting service 205 can configure a variety of options to be associated with the capture request. One such option is an option to provide a video capture (video of a screen or recorded by a camera) of a desired time. This option can be implemented in any of several ways. For example, the web page provided by remote capture service 136 can also include a timer to automatically end the recording when the video capture reaches the maximum length. Another way to implement this feature is by using the object storage service to automatically truncate any recordings that are longer than the configured time.

Security and privacy are also important in the context of the present technology. In addition to state of the art best practices to prevent spoofing and other malicious and unauthorized practices over the Internet, the present technology can also ensure valid users of remote capture service 136 do not abuse the service. For example, object storage service 116 can configure access to the capture object to be via Internet browser only and can prevent the capture object from being downloaded and saved to a local storage on any client device. Object storage service can limit a number times a capture object can be accessed, and can limit an amount of time the capture object can be accessed. Additionally, as addressed above, a capture object can be associated with a time-to-live (TTL) wherein once the TTL expires the capture object can be automatically deleted.

The remote capture service 136 can also include policies for when a capture request can be made. For example, the remote capture service 136 can limit a number of recordings any one user can request over a period. The remote capture service 136 can require a capture request to be linked to a context identified by a ticket ID, a project ID, a classroom, a workflow, etc., and can limit a number of recordings associated with such contexts.

In some embodiments recordings must be associated with a password such that a recording can only be accessed with a password created at the time of remotely configuring the request. In some embodiments, the remote capture requests can be required to be sent by the remote capture service directly at an email address, and only a recipient user that logs in with the same email will be able to utilize the capture service 136.

Figure 7:
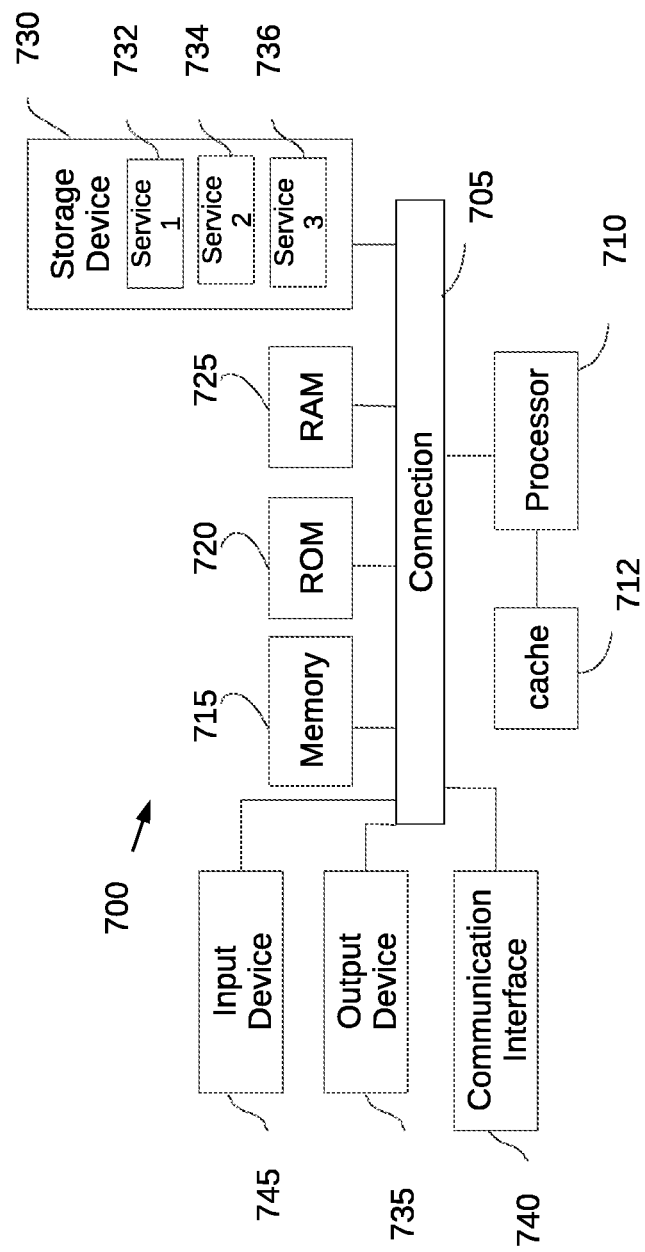
FIG. 7 illustrates an example of computing system 700 in accordance with some aspects of the present technology.

FIG. 7 shows an example of computing system 700, which can be for example any computing device making up the remote capture service 136, the requesting service 205, or recipient device 210, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method for receiving a media capture from a recipient of a request for the media capture comprising: sending the request for the media capture to a recipient device of a recipient user, the request for the media capture being to record content by the recipient device, the request for the media capture being configured by a requesting user; receiving a media capture object including the media capture from the recipient device; and providing access to the media capture object to the requesting user.

Aspect 2: The method of Aspect 1, further comprising: receiving instructions to configure the request for the media capture from the by the requesting user.

Aspect 3: The method of any of Aspects 1 to 2, wherein the instructions to configure the request for the media capture include options, wherein the options include a location to store the media capture object, whether the media capture includes a screen capture and/or a video capture, a length of the media capture.

Aspect 4: The method of any of Aspects 1 to 3, wherein the receiving the instructions to configure the request for the media capture request originates from a service platform, wherein the requesting user interacts with the recipient user through the service platform as the requesting user aids in performing a service provided by the service platform.

Aspect 5: The method of any of Aspects 1 to 4, wherein the service platform is a customer assistance platform.

Aspect 6: The method of any of Aspects 1 to 5, wherein the service platform is an issue tracking platform.

Aspect 7: The method of any of Aspects 1 to 6, wherein the service platform is an educational platform.

Aspect 8: The method of any of Aspects 1 to 7, further comprising: notifying the requesting user when the media capture object is received, wherein the notification is provided to the requesting user through the service platform.

Aspect 9: The method of any of Aspects 1 to 8, further comprising: storing the media capture object to a location in a content management system.

Aspect 10: The method of any of Aspects 1 to 9, wherein the location in the content management system was specified by the requesting user when configuring the request for the media capture.

Aspect 11: The method of any of Aspects 1 to 10, wherein the location in the content management system is a shared folder.

Aspect 12: The method of any of Aspects 1 to 11, wherein the shared folder is shared with members of a team that incudes the requesting user.

Aspect 13: The method of any of Aspects 1 to 12, wherein the shared folder is shared with the recipient user and the requesting user.

Aspect 14: The method of any of Aspects 1 to 13, further comprising: sending a link to access the media capture object to the requesting user and/or the recipient user.

Aspect 15: The method of any of Aspects 1 to 14, wherein the method is performed by the content management system.

Aspect 16: The method of any of Aspects 1 to 15, wherein the request for the media capture is a link with a token embedded in the link identifying attributes of the request for the media capture.

Aspect 17: The method of any of Aspects 1 to 16, further comprising: receiving a request for a resource referenced by the link; transmitting commands interpretable by a browser on the recipient device that is effective to cause the recipient device to initiate the media capture.

Aspect 18: The method of any of Aspects 1 to 17, wherein the commands interpretation by the browser include a call to a browser application programming interface (API) that can initiate the media capture.

Aspect 19: The method of any of Aspects 1 to 18, further comprising: notifying the requesting user when the media capture object is received.

Aspect 20: The method of any of Aspects 1 to 19, wherein the request for the media capture further being configured to link to a workflow, whereby when the media capture object is received, the workflow is triggered.

Aspect 21: The method of any of Aspects 1 to 20, wherein the request for the media capture further being configured to require a specified length of the capture.

Aspect 22: The method of any of Aspects 1 to 21, wherein the request for the media capture further being configured to begin streaming the media capture to the requesting user after the media capture beings.

Aspect 23: The method of any of Aspects 1 to 22, wherein the providing access to the media capture object to the requesting user comprises: sharing the media capture object using a shared link with the requesting user.

Aspect 24: The method of any of Aspects 1 to 23, further comprising: sharing the media capture object using the shared link with the recipient of the request or another user.

Aspect 25: The method of any of Aspects 1 to 24, wherein the providing access to the media capture object to the requesting user comprises: sharing the media capture in an email addressed to the requesting user.

Aspect 26: The method of any of Aspects 1 to 25, wherein the request for the media capture is configured to be associated the media capture object with a time to live (TTL), wherein the media capture object is deleted or becomes inaccessible to the requesting user after the TTL expires.

Aspect 27: A method of initiating a request for a media capture from a recipient device by a requesting device, the method comprising: receiving a selection of a user interface button for sending a request for a media capture to the recipient device, the request for the media capture being to record content by the recipient device; sending the request for the media capture to the recipient device; receiving a notification that a media capture object has been received in response to the request for the media capture object, the notification including a link to access the media capture object.

Aspect 28: The method of Aspect 27, wherein the user interface button is included in a messaging interface presented to the requesting user, the messaging interface being used by the requesting to communicate with a recipient user accessible at the recipient device.

Aspect 29: The method of any of Aspects 27 to 28, wherein the user interface button is provided by a media capture request service that is integrated with the messaging interface.

Aspect 30: The method of any of Aspects 27 to 29, wherein the media capture service is part of a content management service, the method comprising: receiving the media capture object by the content management service; storing the media capture object by the content management service; and providing the link to access the media capture object in the notification.

Aspect 31: The method of any of Aspects 27 to 30, wherein the messaging interface is part of a customer assistance platform.

Aspect 32: The method of any of Aspects 27 to 31, wherein the messaging interface is part of an issue tracking platform.

Aspect 33: The method of any of Aspects 27 to 32, wherein the messaging interface is part of an educational platform.

Aspect 34: The method of any of Aspects 27 to 33, wherein the user interface button displayed in a web interface.

Aspect 35: The method of any of Aspects 27 to 34, further comprising: receiving a configuration of options associated with the request for the media capture.

Aspect 36: The method of any of Aspects 27 to 35, wherein the configuration of options includes a location to store the media capture object, whether the media capture includes a screen capture and/or a video capture, a length of the media capture.

Aspect 37: The method of any of Aspects 27 to 36, wherein the configuration of options includes a location in a content management system where the media content object should be stored after the media capture by the recipient device.

Aspect 38: The method of any of Aspects 27 to 37, wherein the configuration of options includes configuring the link to access the media capture object to be included into a workflow, whereby when the media capture object is received, the workflow is triggered.

Aspect 39: The method of any of Aspects 27 to 38, wherein the configuration of options includes entering a name for the recording.

Aspect 40: The method of any of Aspects 27 to 39, wherein the configuration of options includes configuring a time to live (TTL) to be associated the media capture object, whereby the media capture object is deleted or becomes inaccessible to the requesting user after the TTL expires.

Aspect 41: A method of receiving a request for a media capture from a requesting service, the method comprising: receiving the request for the media capture by a recipient device of a recipient user, the request for the media capture being to record content; presenting a start capture user interface button that is presented in response to the received request for the media capture; receiving a selection of the start capture user interface button; initiating the media capture by the recipient device after receiving the selection of the start capture user interface button; terminating the media capture; and sending a media capture object including the media capture to the requesting service.

Aspect 42: The method of Aspect 41, wherein the sending a media capture object including the media capture to the requesting service includes sending the media capture object to the requesting user.

Aspect 43: The method of any of Aspects 41 to 42, wherein the request for the media capture includes options that were preconfigured by the requesting user.

Aspect 44: The method of any of Aspects 41 to 43, wherein the options include a requirement to have a camera on.

Aspect 45: The method of any of Aspects 41 to 44, wherein the options include a location to store the media capture object, whether the media capture includes a screen capture and/or a video capture, a length of the media capture.

Aspect 46: The method of any of Aspects 41 to 45, further comprising: storing the media capture object to a location in a content management system.

Aspect 47: The method of any of Aspects 41 to 46, wherein the sending the media capture object including the media capture to the requesting service includes sending a link to the media capture object at the location in the content management system.

Aspect 48: The method of any of Aspects 41 to 47, wherein the requesting service is a service platform, wherein the recipient user interacts with a requesting user through the service platform as the requesting user aids in performing a service provided by the service platform.

Aspect 49: The method of any of Aspects 41 to 48, the method comprising: receiving a selection of media capture options prior to the receiving the selection of the start capture user interface button.

Aspect 50: The method of any of Aspects 41 to 49, wherein the user options include a selection of a window or screen to capture, and whether to turn on a camera or a microphone of the recipient device.

Aspect 51: The method of any of Aspects 41 to 50, the method comprising: receiving a selection of system permissions to permit a web interface to have access to a camera or to screen capture a window.

Aspect 52: The method of any of Aspects 41 to 51, wherein the receiving the request for the media capture by a recipient device occurs in a web interface.

Aspect 53: The method of any of Aspects 41 to 52, wherein the request for the media capture is a link received in a messaging platform, the link causing the recipient device to display the web interface with the request for the media capture.

What is claimed is:

1. A method for sending a request for a media capture by a remote capture service, the method comprising:
    receiving a selection of a user interface option within a requesting service, the user interface option is for initiating the request for the media capture to a recipient device, the request for the media capture being to record content by the recipient device, the user interface option being provided by the remote capture service that is separate from the requesting service;
    presenting a user interface of the remote capture service, to configure options at the remote capture service for the request for the media capture, wherein the options define one or more parameters for the media capture for the recipient device to perform the media capture;
    sending the request for the media capture to the recipient device; and
    receiving a notification that a media capture object has been received in response to the request for the media capture, the notification including a link to access the media capture object.

2. The method of claim 1, wherein the user interface option is included in a messaging interface presented to a requesting user, the messaging interface being used by the requesting user to communicate with a recipient user at the recipient device.

3. The method of claim 2, wherein the user interface option is provided by the remote capture service that is integrated with the messaging interface.

4. The method of claim 3, wherein the remote capture service is part of a content management service, the remote capture service is configured to:
    receive the media capture object by the content management service;
    store the media capture object by the content management service; and
    provide the link to access the media capture object in the notification.

5. The method of claim 2, further comprising:
receiving a request link referencing the request for the media capture, wherein the sending the request for the media capture to the recipient device includes providing the request link in the messaging interface.

6. The method of claim 1, wherein the options include configuring a time-to-live (TTL) to be associated with the media capture object, whereby the media capture object is deleted or becomes inaccessible to the requesting user after the TTL expires.

7. The method of claim 1, wherein the options include configuring the recipient device to initiate streaming of the media capture in conformance with the one or more parameters after the media capture begins.

8. The method of claim 1, wherein the link includes an embedded token identifying attributes of the request for the media capture, the identifying attribute including an identification of a communication thread in which the notification and the link was included.

9. The method of claim 1, further comprising:
transmitting commands to be performed by the recipient device, wherein the commands are interpretable by a browser on the recipient device that is effective in causing the recipient device to initiate the media capture.

10. A system comprising:
one or more processors; and
at least one computer-readable storage medium having stored therein instructions which, when executed by the one or more processors, cause the system to:
receive a selection of a user interface option within a requesting service, the user interface option is for initiating a request for a media capture to a recipient device, the request for the media capture being to record content by the recipient device, the user interface option being provided by a remote capture service that is separate from the requesting service;
present a user interface of the remote capture service to configure options at the remote capture service for the request for the media capture, wherein the options define one or more parameters for the media capture for the recipient device to perform the media capture;
send the request for the media capture to the recipient device; and
receive a notification that a media capture object has been received in response to the request for the media capture, the notification including a link to access the media capture object.

11. The system of claim 10, wherein the user interface option is included in a messaging interface presented to a requesting user, the messaging interface being used by the requesting user to communicate with a recipient user at the recipient device.

12. The system of claim 11, wherein the user interface option is provided by the remote capture service that is integrated with the messaging interface.

13. The system of claim 12, wherein the remote capture service is part of a content management service, the remote capture service is configured to:
receive the media capture object by the content management service;
store the media capture object by the content management service; and
provide the link to access the media capture object in the notification.

14. The system of claim 11, further comprising:
receiving a request link referencing the request for the media capture, wherein the sending the request for the media capture to the recipient device includes providing the request link in the messaging interface.

15. The system of claim 10, wherein the options include configuring a time-to-live (TTL) to be associated with the media capture object, whereby the media capture object is deleted or becomes inaccessible to the requesting user after the TTL expires.

16. The system of claim 10, wherein the options include configuring the recipient device to initiate streaming of the media capture in conformance with the one or more parameters after the media capture begins.

17. The system of claim 10, wherein the link includes an embedded token identifying attributes of the request for the media capture, the identifying attribute including an identification of a communication thread in which the notification and the link was included.

18. The system of claim 10, further comprising:
transmitting commands to be performed by the recipient device, wherein the commands are interpretable by a browser on the recipient device that is effective in causing the recipient device to initiate the media capture.

19. A non-transitory computer-readable medium comprising:
instructions stored therein which, when executed by one or more processors, cause the one or more processors to:
receive a selection of a user interface option within a requesting service, the user interface option is for initiating a request for a media capture to a recipient device, the request for the media capture being to record content by the recipient device, the user interface option being provided by a remote capture service that is separate from the requesting service;
present a user interface of the remote capture service to configure options at the remote capture service for the request for the media capture, wherein the options define one or more parameters for the media capture for the recipient device to perform the media capture;
send the request for the media capture to the recipient device; and
receive a notification that a media capture object has been received in response to the request for the media capture, the notification including a link to access the media capture object.

20. The non-transitory computer-readable medium of claim 19, further comprising:
receiving a request link referencing the request for the media capture, wherein the sending the request for the media capture to the recipient device includes providing the request link in a messaging interface.

* * * * *